US009624982B2

(12) United States Patent
Schussler

(10) Patent No.: US 9,624,982 B2
(45) Date of Patent: Apr. 18, 2017

(54) HOLLOW SHAFT COUPLING

(71) Applicant: RINGFEDER POWER-TRANSMISSION GMBH, Grosswallstadt (DE)

(72) Inventor: Gerd Schussler, Grosswallstadt (DE)

(73) Assignee: RINGFEDER POWER-TRANSMISSION GMBH, Grosswallstadt (DE)

(*) Notice: Subject to any disclaimer, the term of this patent is extended or adjusted under 35 U.S.C. 154(b) by 359 days.

(21) Appl. No.: 14/255,613

(22) Filed: Apr. 17, 2014

(65) Prior Publication Data
US 2014/0227029 A1 Aug. 14, 2014

Related U.S. Application Data

(62) Division of application No. 13/129,127, filed as application No. PCT/EP2009/065056 on Nov. 12, 2009, now Pat. No. 8,727,657.

(30) Foreign Application Priority Data

Nov. 13, 2008 (EP) .................... 08019852

(51) Int. Cl.
*F16D 1/09* (2006.01)
*F16D 1/04* (2006.01)
(52) U.S. Cl.
CPC ............... *F16D 1/04* (2013.01); *F16D 1/09* (2013.01); *F16D 2001/0903* (2013.01);
(Continued)

(58) Field of Classification Search
CPC .... F16B 7/0406; F16B 7/0413; F16B 7/0426; F16D 1/09; F16D 1/12; F16D 3/72; F16D 3/74; F16D 2001/0903
See application file for complete search history.

(56) References Cited

U.S. PATENT DOCUMENTS

| 355,062 | A | 12/1886 | Cook |
| 738,809 | A | 9/1903 | Hutchison |

(Continued)

FOREIGN PATENT DOCUMENTS

| DE | 9003205.5 U1 | 8/1990 |
| DE | 4340030 C1 | 4/1995 |

(Continued)

OTHER PUBLICATIONS

International Search Report in PCT/EP2009/065056, dated Mar. 3, 2010.

(Continued)

*Primary Examiner* — Michael P Ferguson
(74) *Attorney, Agent, or Firm* — Bacon & Thomas, PLLC

(57) ABSTRACT

A hollow shaft coupling for connecting a shaft to a hollow shaft, where the hollow shaft coupling can be arranged completely in the hollow shaft and can effect clamping both radially inwardly as well as radially outwardly. The coupling enables a first clamping unit to clamp the hollow shaft coupling radially inwardly against the shaft and a second clamping unit which is separate from the first clamping unit to clamp the hollow shaft coupling radially outwardly against the inner circumferential surface of the hollow shaft, with the two clamping units spaced apart from one another axially, and the two clamping units connected to one another via a play-free and rotationally stable coupling which is arranged between them.

4 Claims, 5 Drawing Sheets

(52) U.S. Cl.
CPC ...... *Y10T 403/557* (2015.01); *Y10T 403/5706* (2015.01); *Y10T 403/5793* (2015.01); *Y10T 403/7062* (2015.01); *Y10T 403/7067* (2015.01)

(56) References Cited

U.S. PATENT DOCUMENTS

| | | | |
|---|---|---|---|
| 748,373 A | 12/1903 | Hendershot | |
| 923,714 A | 6/1909 | Searle | |
| 2,308,542 A | 1/1943 | Raybould | |
| 3,191,285 A * | 6/1965 | Shamie | C25D 1/02 205/114 |
| 3,455,013 A * | 7/1969 | Rayburn | F16D 3/72 228/160 |
| 4,134,699 A | 1/1979 | Schafer et al. | |
| 4,781,486 A | 11/1988 | Mochizuki | |
| 5,741,187 A | 4/1998 | Fiedler | |
| 6,413,164 B1 * | 7/2002 | Vogl | F16D 1/08 464/79 |
| 6,514,146 B1 * | 2/2003 | Shinozuka | F16D 3/72 464/79 |
| 6,527,472 B1 | 3/2003 | Varnai | |
| 6,969,211 B2 | 11/2005 | Altman | |
| 7,150,680 B2 | 12/2006 | White | |
| 8,727,657 B2 * | 5/2014 | Schussler | F16D 1/09 403/297 |

FOREIGN PATENT DOCUMENTS

| | | |
|---|---|---|
| DE | 9321116 U1 | 4/1996 |
| DE | 19819239 A1 | 11/1999 |
| EP | 0318669 A1 | 10/1988 |
| EP | 1923588 A1 | 11/2006 |
| GB | 1016675 A | 1/1966 |
| GB | 1402250 A | 8/1975 |
| WO | 2005036004 A1 | 4/2005 |

OTHER PUBLICATIONS

English translation of International Preliminary Report on Patentability in PCT/EP2009/065056, dated May 26, 2011.

* cited by examiner

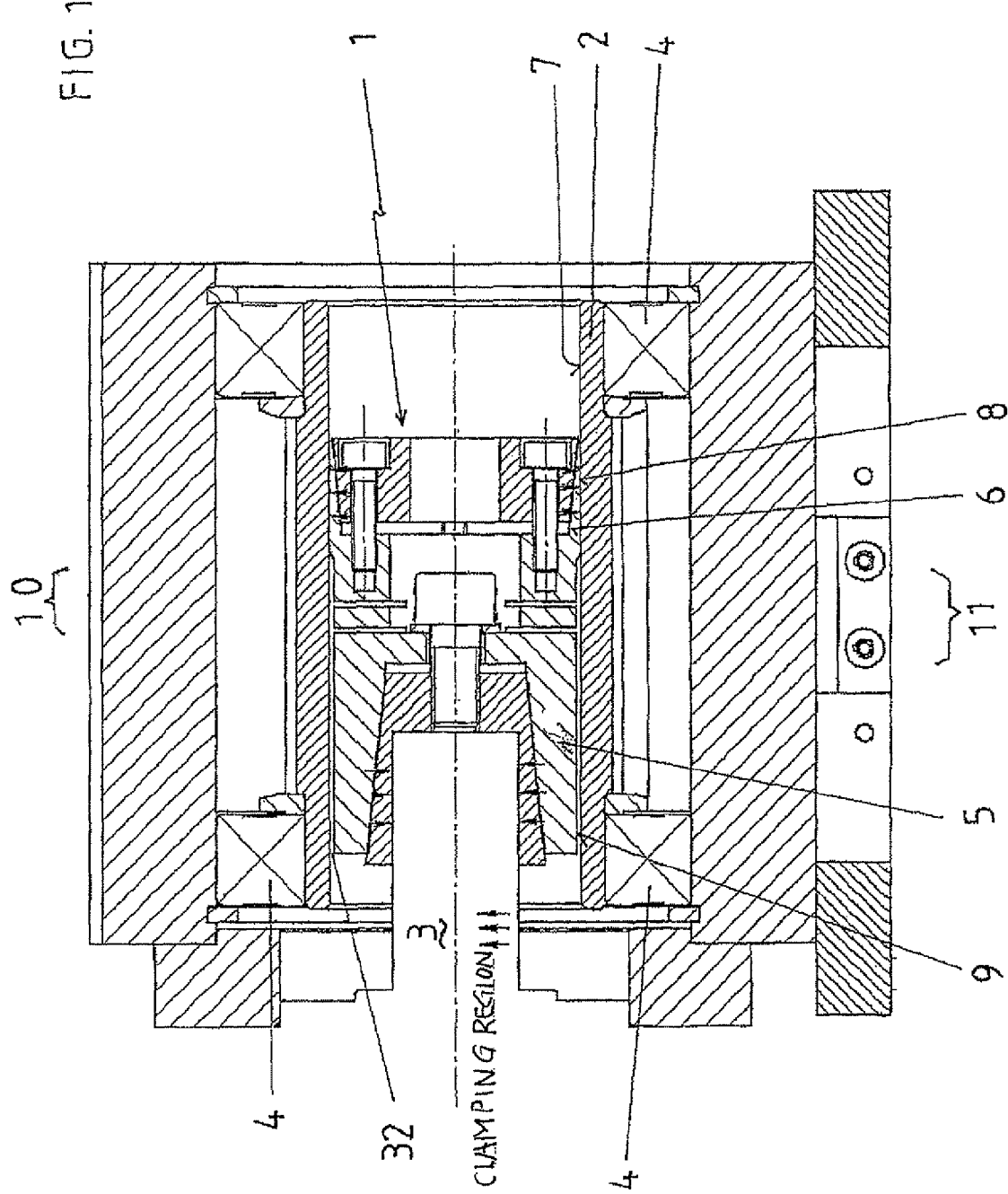

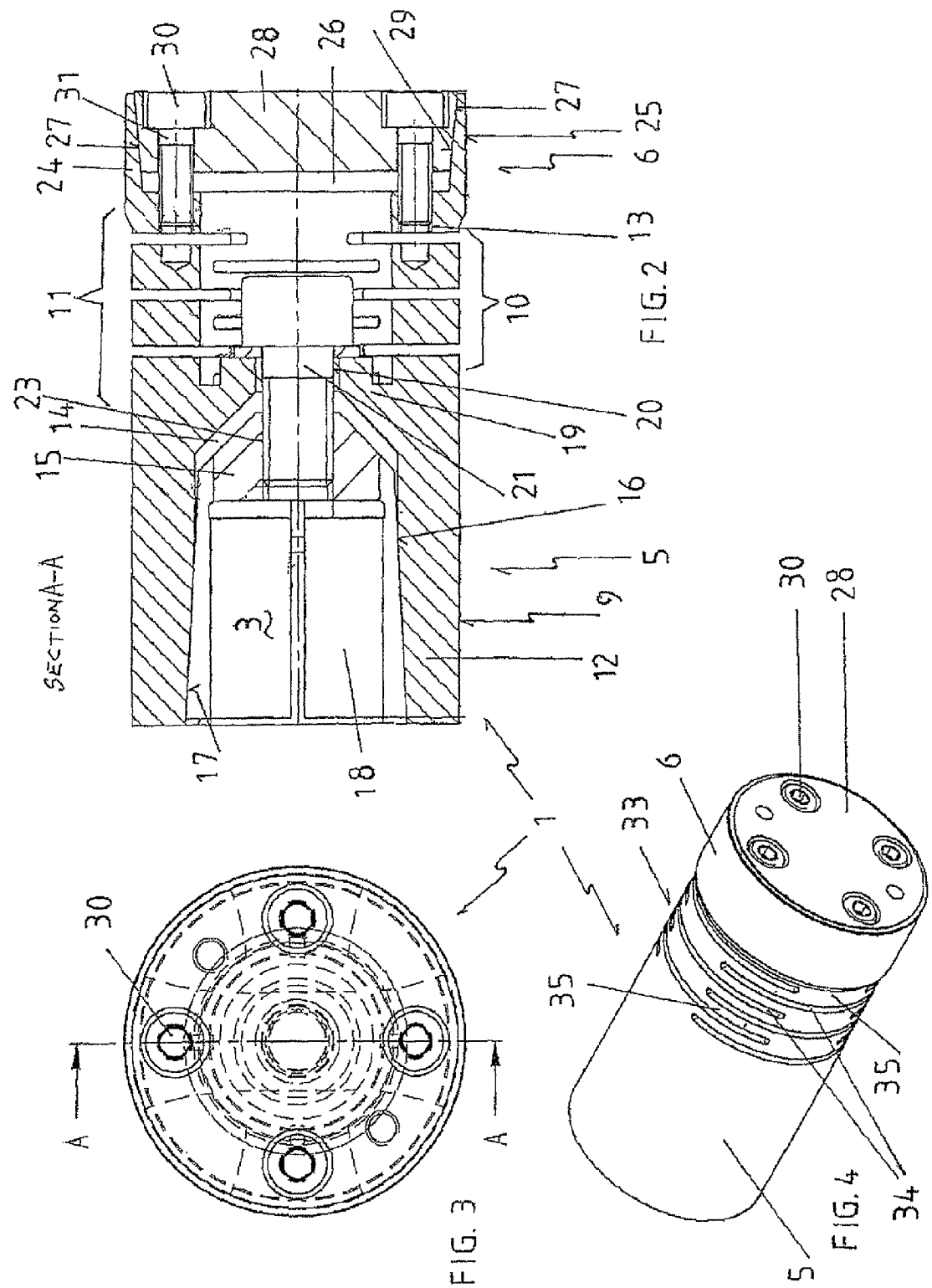

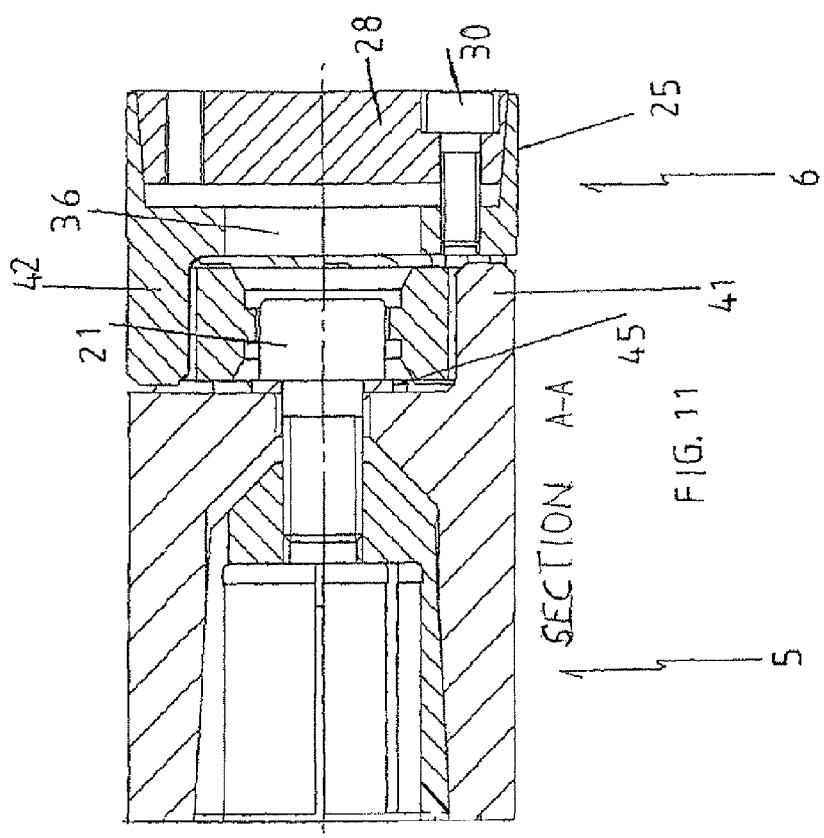
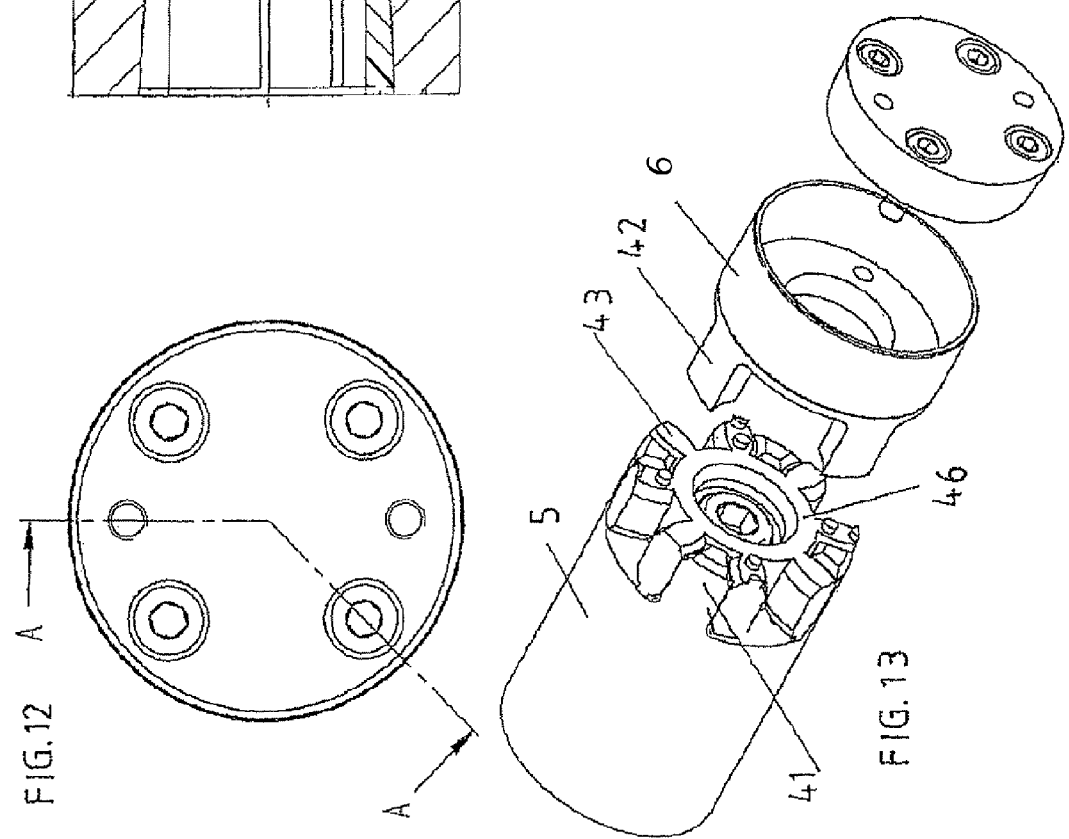

HOLLOW SHAFT COUPLING

BACKGROUND OF THE INVENTION

Field of the Invention

The invention relates to a hollow shaft coupling for connecting a shaft to a hollow shaft, wherein said hollow shaft coupling can be arranged completely in the hollow shaft and can effect clamping both radially inwardly as well as radially outwardly.

Related Art

Such hollow shaft couplings inter alia serve to couple a motor to a linear unit. In the operating state, such a hollow shaft coupling is arranged completely in the hollow shaft and hence is situated quasi inside the hollow shaft. A shaft, for example, a solid shaft, connected to the hollow shaft by means of the hollow shaft coupling via clamping protrudes in axially from outside. Usually, a clamping unit serves to ensure this clamping which can achieve clamping both radially inwardly as well as radially outwardly. In addition, this known clamping unit is arranged on the axial level of the ball bearing which supports the hollow shaft.

Since the central axes of the shaft and the hollow shaft are often offset relative each other and compensating is not possible, this leads to various problems. These include, for example, an axial bearing load due to thermal expansion and mounting errors as well as a radial bearing load due to the axes being offset. Since the forces acting radially outwardly occur in the area of the ball bearings, this can additionally result in a distortion of the ball bearing(s) and a bulging of the hollow shaft.

BRIEF SUMMARY OF THE DISCLOSURE

The task of the present invention is to provide a hollow shaft coupling by means of which a shaft can be clamped and thus connected to a hollow shaft without problem.

This task is solved by a hollow shaft coupling comprising two separate clamping units. A first clamping unit clamps the hollow shaft coupling against the shaft radially inwardly, whereas a second clamping unit, which is separate from the first clamping unit, clamps the hollow shaft coupling against the hollow shaft radially outwardly. The two clamping units are in this case axially spaced apart from one another. Since the shaft to be clamped protrudes into the hollow shaft from the outside, the first clamping unit is located on the side facing the shaft while the second clamping unit is arranged further inside the hollow shaft. In the clamped state, there is a force-fit connection between the hollow shaft and the shaft.

The two clamping units are interconnected via a play-free and rotationally stable coupling which is arranged between said two clamping units. A coupling of the herein mentioned kind usually comprises two hubs and an interposed coupling element which interconnects the hubs. One of the hubs is usually coupled with a drive and the other with an output.

In the coupling mentioned here, the two clamping units may quasi constitute the hubs which couple the drive, e.g. the motor shaft, with the output, e.g. the hollow shaft.

Using the hollow shaft coupling according to the invention, various advantages can be achieved depending on the configuration and embodiment.

As a result of the two clamping units being axially spaced apart from one another, the ball bearing of the hollow shaft is no longer distorted. Also the bulging of the hollow shaft can be minimized. In addition, it is possible to compensate for an offset of the central axes of the shaft and the hollow shaft and to adjust for mounting tolerances. In the case of resonance vibrations, same can be neutralized.

These and further advantages will be explained below in more detail with reference to the drawings.

Like the corresponding clamping unit in the known hollow shaft coupling, the clamping units employed according to the invention have a cylindrical outer circumferential surface. The inner circumferential surface of the hollow shaft is also cylindrical. The clamping units need to be dimensioned such that they can be completely pushed into the hollow shafts. The outer diameter of the clamping units is in this case slightly smaller than the inner diameter of the hollow shaft so that the hollow shaft coupling—as mentioned—can be inserted into the hollow shaft.

According to a preferred embodiment, the outer diameter of the second clamping unit is larger than the outer diameter of the first clamping unit. If the outer diameter of the second clamping unit is in this case selected such that, although it can still be inserted into the hollow shaft, it will have the most precise fit possible, the outer circumferential surface of the first clamping unit will be spaced apart from the inner circumferential surface of the hollow shaft by a certain amount. During the actuating of the first clamping unit and hence during the clamping, said clamping unit can still expand or bulge radially outwardly without coming into a bearing contact against the inner circumferential surface of the hollow shaft or without, provided a bearing contact occurs, excessively large forces acting radially outward being generated. In this manner it is ensured that a radially outward clamping only or almost only takes place in the axial region of the second clamping unit which is axially spaced apart from the ball bearing of the hollow shaft usually arranged in the axial end areas of the hollow shaft.

According to a further preferred embodiment, the coupling employed according to the invention is a plug-in coupling, i.e., a pluggable coupling. The two coupling hubs are formed at the axial ends of the clamping units facing each other. This can be achieved, for example, by integrally forming said coupling hubs with or fixedly coupling said coupling hubs to the clamping units. Incidentally, this not only applies to a plug-in coupling but also to the other couplings described below in more detail.

The connecting of the two coupling hubs is then performed by at least one plug part which extends from one coupling hub to the other and prevents the two coupling hubs, respectively the two clamping units, from twisting relative each other. This plug part can, for example, be a pin, for example a cylindrical pin, the one end of which is inserted into a recess in one coupling hub and the other end into a recess in the other coupling hub.

The structural configuration of such a plug-in coupling is described for example in DE 198 19 239 A1. The cylindrical pins mentioned here and also described therein hence constitute the coupling element which couples the two hubs (in the present case the clamping units) together.

According to a further preferred embodiment, the coupling employed here according to the invention represents a bellows coupling and in particular a metallic bellows coupling. The coupling element coupling the two hubs together is in this case a particularly resilient bellows. Such a coupling type is described for example in EP 1 923 588 A1.

An elastomer coupling may also be used as a coupling type for the hollow shaft coupling according to the invention. In such a coupling type, a plurality of protrusions or pins extend from the two hubs in the axial direction as well as in the direction of the opposite coupling hub. Moreover, a toothed elastomer wheel is arranged between the two coupling hubs which has radially outwardly projecting protrusions which come to rest between two pins/protrusions in the assembled state of this coupling. In this case, the coupling element is formed by said pins/protrusions and the toothed elastomer wheel including its protrusions.

In a further preferred embodiment, the coupling element consists of a spring disk arrangement. The corresponding coupling thus represents a so-called flexible coupling with spring disks. Such a coupling type is described for example in EP 0 318 669 A1.

In order to effect the clamping of a clamping unit, an actuating means usually has to be used. To actuate the first clamping unit of the hollow shaft coupling according to the invention and hence to be able to clamp the shaft using the clamping unit, the associated actuating means must be able to be actuated from the other axial side of the hollow shaft and thus from the side lying opposite the inserted shaft. The coupling element therefore preferably comprises an opening through which the actuating means is accessible from the side of the hollow shaft facing away from the shaft. Said actuating means is preferably a centric threaded screw, the head of which points toward the side of the hollow shaft facing away from the shaft. The first clamping unit is actuated by turning said threaded screw. This will be explained in more detail below using examples. In the coupling types described above, all of the coupling elements employed for this purpose exhibit such an opening, e.g. a central bore or a central opening through which a screwdriver or a hexagon key can extend in order for the actuating means to become active. Preferably, the threaded screw is thus a hexagon screw.

The threaded screw preferably engages in a threaded bore of a cone-shaped clamping cone which cooperates with a clamping bush of conical configuration for forming the first clamping unit.

The inventive functional parts of the hollow shaft coupling according to the invention, and hence also of the clamping units and the coupling element, are manufactured of appropriate material able to withstand the load. Materials of this type are, for example, steel or a metal such as aluminum, for instance. Such materials are well known in the field of couplings.

BRIEF DESCRIPTION OF THE DRAWINGS

The invention is explained hereinafter in more detail on the basis of several exemplary preferred embodiments with reference to the accompanying drawings. Shown are:

FIG. 1 a longitudinal sectional view through a hollow shaft coupling according to the invention which is inserted into a hollow shaft and clamps a shaft to the hollow shaft, FIG. 2 an analogous longitudinal sectional view to FIG. 1 through a hollow shaft coupling comprising a spring disk coupling, FIG. 3 a view of the right-hand front face of the hollow shaft coupling shown in FIG. 2 illustrating the extension of the A-A cut in FIG. 2, FIG. 4 a perspective view of the hollow shaft coupling shown in FIG. 2, FIG. 5 a longitudinal sectional view of a further embodiment of a hollow shaft coupling according to the invention comprising a plug-in coupling, FIG. 6 a top view of the right-hand front face of the hollow shaft coupling shown in FIG. 5 including the extension of the A-A cut, FIG. 7 a perspective representation of the hollow shaft coupling shown in FIG. 5 in an exploded view, FIG. 8 a longitudinal sectional view of a further embodiment of the hollow shaft coupling according to the invention comprising a bellows coupling, FIG. 9 a top view of the right-hand front face of the hollow shaft coupling shown in FIG. 8 including the extension of the A-A cut, FIG. 10 a perspective view of the hollow shaft coupling shown in FIG. 8, FIG. 11 a longitudinal sectional view of a further hollow shaft coupling comprising a spring disk coupling, FIG. 12 a top view of the right-hand front face of the hollow shaft coupling shown in FIG. 11 and the extension of the A-A cut, and FIG. 13 a perspective view of the hollow shaft coupling shown in FIG. 11 in an exploded view.

DETAILED DESCRIPTION OF VARIOUS EMBODIMENTS OF THE DISCLOSURE

Figure 5:
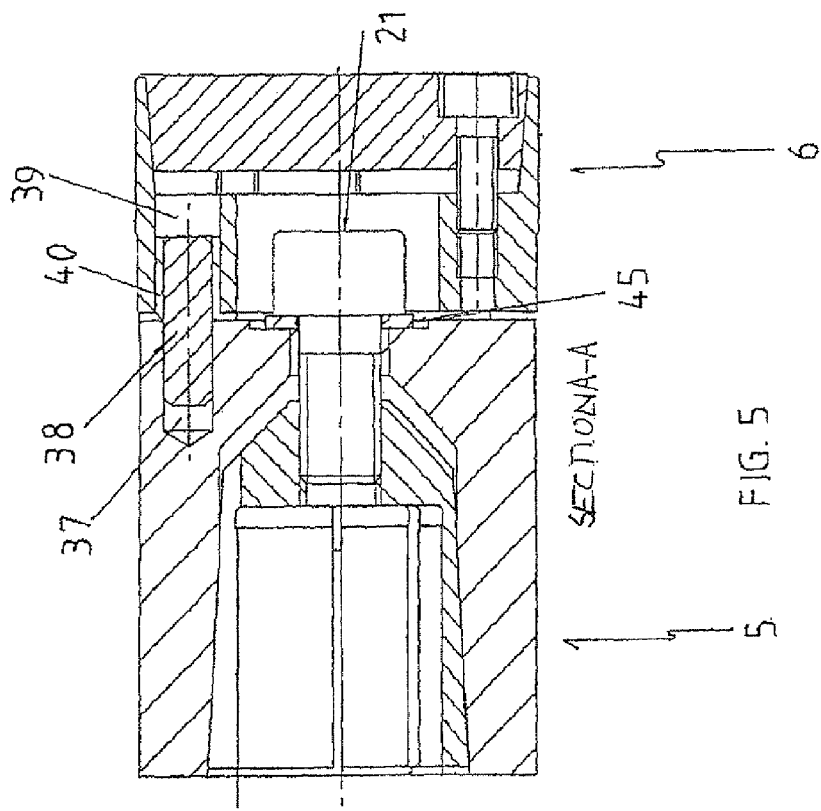

The hollow shaft coupling 1 according to the invention shown in FIG. 1 in a longitudinal sectional view is inserted into a hollow shaft 2 and clamps said hollow shaft 2 to a shaft 3 which may be a solid motor shaft.

The hollow shaft 2 serves as a toothed belt drive of a linear unit and is rotatably supported at its axial ends by ball bearings 4.

The hollow shaft 1 has two axially spaced clamping units, namely a first clamping unit 5 and a second clamping unit 6.

The first clamping unit 5 clamps the shaft 3 to the hollow shaft 1. In FIG. 1, the clamping region is indicated with arrows which also indicate the radial direction of the exerted clamping force. Accordingly, a radially inward clamping takes place.

The second clamping unit 6 clamps the hollow shaft coupling 1 to the hollow shaft 2. In this case as well, the clamping area is represented by arrows. Accordingly, said clamping unit exerts a radially outward clamping force and presses the outer circumferential surface 8 of said second clamping unit 6 against the inner circumferential surface 7 of hollow shaft 2.

The outer diameter of the second clamping unit 6 is larger than the outer diameter of the first clamping unit 5 and its outer circumferential surface 8 rests against or is closely spaced from the inner circumferential surface 7.

The outer diameter of the hollow shaft coupling 1 is smaller in the area of the first clamping unit 5 so that the outer circumferential surface 9 of the first clamping unit 5 is spaced apart from the inner circumferential surface 7.

A coupling element 10 is situated between the two clamping units 5 and 6 which connects the two clamping units 5, 6 to one another in a play-free or free from backlash or flow or play and rotationally stable manner. The embodiment shown in FIG. 1 is in this case a spring disk unit (which is explained below in more detail).

The clamping units 5 and 6 which quasi constitute the coupling hubs of the coupling 11 are axially spaced apart, as already mentioned. Although the clamping region of the first clamping unit 5 lies in the axial area of the ball bearing 4 facing the shaft, it exerts its clamping action inwardly so that no ball bearing distortion can occur in this area.

The clamping force exerted by the second clamping unit 6 acting radially outwardly is in an area spaced apart from the ball bearings 4 whereby the bulging of hollow shaft 2 is minimized.

The interposing of a coupling element 10 allows for compensating for the offset of the central axes of shaft 3 and hollow shaft 2. In addition, mounting tolerances can thereby be adjusted. Such a coupling 11 including the coupling element 10 is also capable of neutralizing resonance vibrations.

FIG. 1 serves primarily to explain the action principle of the hollow shaft coupling 1 according to the invention. The spring disk coupling shown in FIG. 1, respectively the coupling element in the form of a spring disk means, respectively spring disk arrangement, is explained in more detail in FIGS. 2 to 4, wherein the coupling element 10 shown in FIG. 2 has more spring disks than the coupling element 10 shown in FIG. 1.

In FIG. 2, the hollow shaft coupling 1 according to the invention is shown alone and hence in the non-installed state in order to allow for a better explanation of said hollow shaft coupling 1.

The hollow shaft coupling 1 comprises a first clamping unit 5 and a second clamping unit 6. The first clamping unit 5 comprises a clamping bush 12 having a cylindrical outer circumferential surface 9 and a centric approximately cylindrical cavity 14. Said cavity 14, however, is not strictly cylindrical but tapers like a cone from axially outward toward axially inward.

In said cavity 14, an inner cone 15 is inserted which has a conical outer circumferential surface 16 of a complementary configuration to the inner circumferential surface 17 of the clamping bush 12.

The inner cone 15 has a centric cylindrical inner cavity 18 into which shaft 3 protrudes. Axially internally, the first clamping unit 5 is provided with an annular shoulder 19 which protrudes parallel toward the inside and delimits a passage opening 20 through which a threaded hexagon screw 21 extends. The thread head 22 including the hexagon is supported by the annular shoulder 19.

The threaded hexagon screw 21 protrudes into the centric threaded bore 23 at the axially inner end of the inner cone 15 and cooperates with same. When the threaded hexagon screw 21 is turned, said inner cone 15 is drawn into the cavity 14. During this, the conical inner circumferential surface 16 of the inner cone 15 slides onto, respectively along, the likewise conical inner circumferential surface 17 of clamping bush 12, whereby shaft 3 is clamped.

The second clamping unit 6 is situated axially opposite the first clamping unit 5 and comprises a clamping bush 24 having a cylindrical outer circumferential surface 25 and an inner space 26 having a cone-like cross-section. The inner circumferential surface 27 which radially delimits the inner space 26 outwardly tapers conically in the direction of the first clamping unit 5.

A cone 28 is inserted into said inner space 26, the outer circumferential surface 29 of which is conically reduced, respectively tapered, toward the first clamping unit 5. In other words, the diameter of the inner space 26 decreases continuously from the axially inner end to the first clamping unit 5.

The cone 28 has a plurality of through-bores 31 arranged radially externally through which an axially extending threaded hexagon screw 30 extends. Said threaded hexagon screws 30 are supported on the cone 28 by their thread heads and extend into corresponding threaded bores 13 in the coupling 11. When the threaded hexagon screw is tightened, the cone 28 is drawn into the inner space 26. During this, the conical outer circumferential surface 29 of cone 28 slides onto the complementary conical inner circumferential surface 27 of clamping bush 24, whereby a clamping, respectively pressing, takes place in the radially outward direction. In the process, the outer circumferential surface 25 of clamping bush 24 is pressed against the inner circumferential surface not shown in FIG. 2 of hollow shaft 2, cf. also FIG. 1.

The outer diameter of the clamping bush 24 is larger in the area of the outer circumferential surface 25 than the outer diameter of the first clamping unit 5, respectively clamping bush 12. Thereby, an annular gap 32 is formed between the first clamping unit 5 and the hollow shaft 2 which surrounds same, cf. also FIG. 1.

The action principle of the two clamping units 5 and 6 and their structural configuration is incidentally known.

The coupling 11 is situated between the two clamping units 5 and 6.

For reasons of better representability and clearer terminological delimitation, the combination of the two clamping units 5, 6 and the interposed coupling which connects said clamping units is referred to as a hollow shaft coupling within the framework of the present invention. In contrast, only the connecting means or connecting device between the two clamping units is referred to as a coupling.

A coupling consists—as already explained above—of two coupling hubs for the drive, respectively output, of a coupling element connecting said two coupling hubs.

The coupling hubs of the coupling 11 according to the invention can be configured to be separate. In this case, the respective coupling hub needs to be connected to the associated clamping unit 5 or 6 in a rotationally stable manner. Said coupling hubs can, however, also be an integral component of the two clamping units and formed at the ends facing one another, just as is the case in the coupling of the embodiments shown in the figures. The coupling 11 illustrated in FIG. 2 is a spring disk coupling. The coupling element 10 has a cylindrical body 33 (see FIG. 4) which at its two axial ends merges into, respectively is integrally formed with, the first clamping unit 5 on the one hand and the second clamping unit 6 on the other. Slots 34 are arranged transversely to the longitudinal axis of the body 33 and lie in axially spaced cross-sectional planes. The slots 34 of one cross-sectional plane are separated from each other by spring disks 35 which are connected to each other, respectively the first clamping unit 5 and the second clamping unit 6, via webs 35. Such a spring disk arrangement is described in the European Patent Application No. 0 318 669 A1 already mentioned in the beginning, the content of which is hereby incorporated into the present application.

Figure 6:
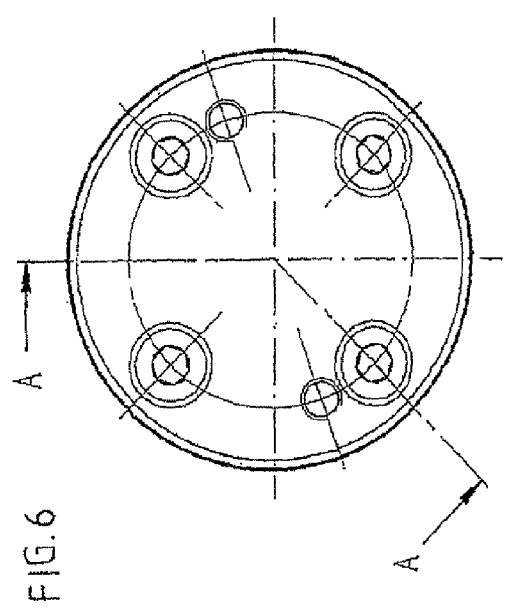
Figure 7:
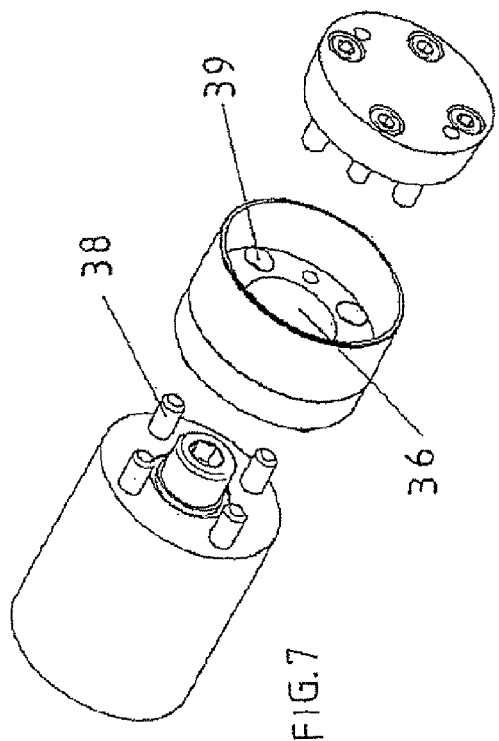

The embodiment shown in FIGS. 5 to 7 constitutes a plug-in coupling. The first clamping unit 5 and the second clamping unit 6 are in this case of identical or similar configuration to the corresponding clamping units of the embodiment shown in FIGS. 2 to 4. Identical or similar elements or parts are therefore identified by the same reference numerals.

The first clamping unit 5 in the plug-in coupling has, at its end pointing toward the second clamping unit 6, a plurality of axially extending blind bores 37 which are uniformly distributed over the circumference, into each of which a pin 38 is inserted which protrudes axially outwardly beyond the end of the second clamping unit 5 and into a corresponding passage bore 39 in the opposite end of the second clamping unit 6. The pins 38 are cylindrical pins which are inserted inside the passage bore 39 into a lining 40 of a synthetic material having plain bearing capability. The cylinder pins 38 are inserted into the blind bores 37 in a precise fit. Such a structural configuration, respectively plug-in coupling, is described in DE 198 19 239 A1 which was also mentioned in the beginning and the content of which is hereby incorporated into the present application.

Figure 8:
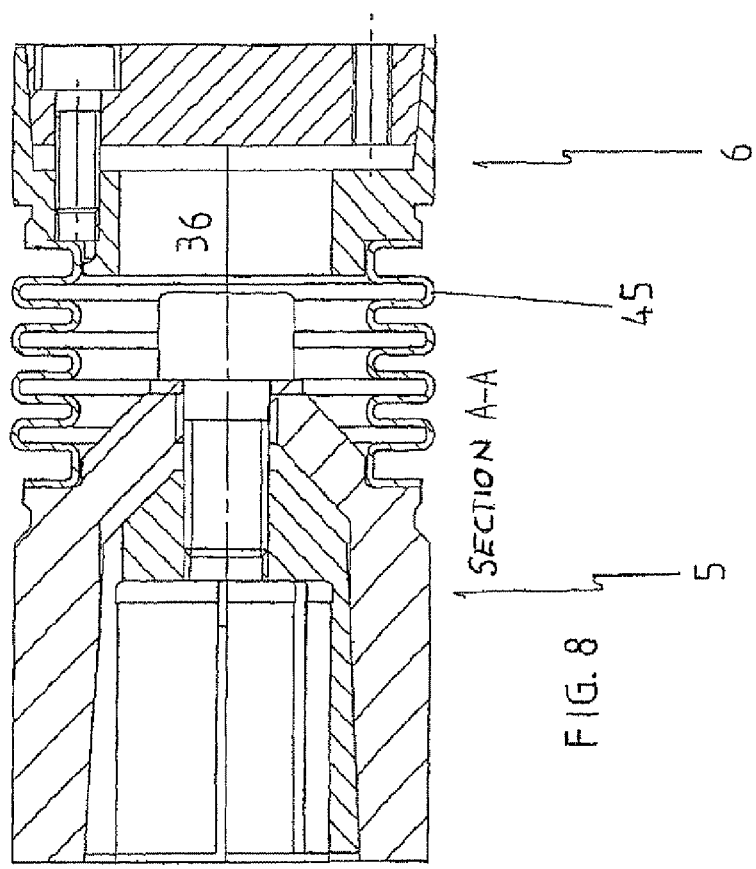
Figure 9:
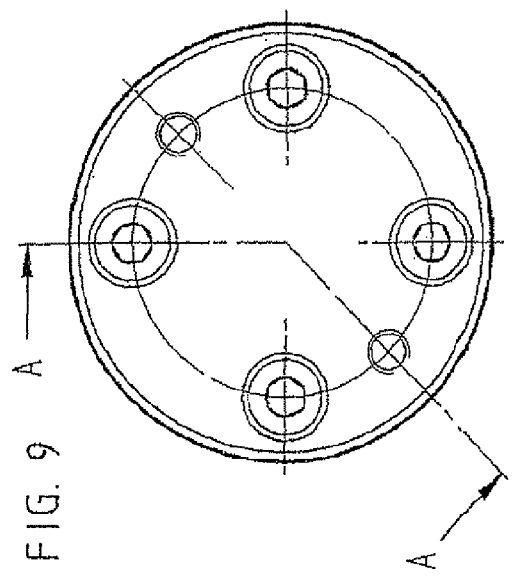
Figure 10:
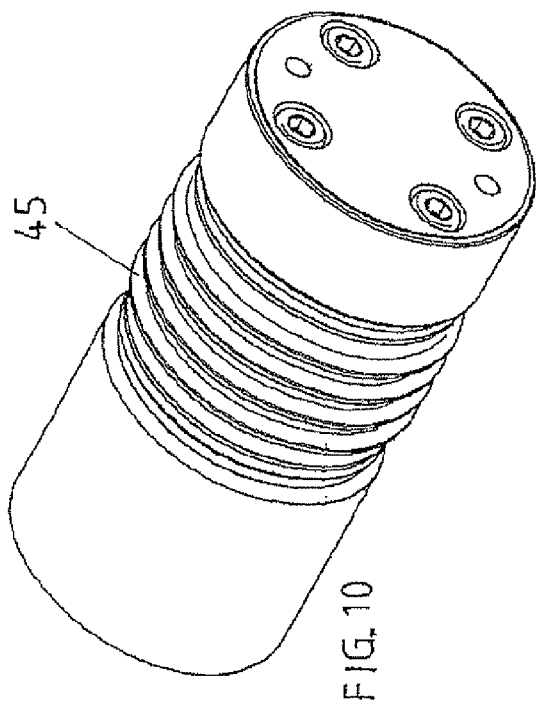

In the embodiment shown in FIGS. 8 to 10, the two clamping units 5 and 6 are connected by means of a metallic bellows coupling. The coupling element 11 thus comprises a metallic bellows 45, the ends of which are fastened, respectively fixedly connected, e.g. by gluing, to the first clamping unit 5 on the one hand, and to the second clamping unit 6 on the other.

Such a coupling type is described, for example, in the EP 1 923 588 A1 document, the content of which is hereby incorporated into the present application.

The coupling shown in FIGS. 11 to 13 is an elastomer coupling. The two clamping units 5 and 6 in this embodiment likewise correspond to the clamping units which have already been described in connection with the other embodiments. The difference primarily resides in the coupling 11, respectively the coupling element 10.

At their facing ends, both the first clamping unit 5 and the second clamping unit 6 comprise peripherally-arranged projections 41, respectively 42, extending axially parallel. The number of projections 41 and 42 is equivalent in this case. The radial spacing of the projections 41 is in this case dimensioned such that between two adjacent projections 41 on the periphery, a facing projection 42 and a radially extending tooth 43 of a toothed elastomer wheel 44 can come to rest and closely abut against each other laterally, with the tooth of elastomer material being slightly compressed between the two abutting projections 41 and 42. The teeth 43 of said toothed elastomer wheel 44 are integrally formed with a ring 45.

Such an elastomer coupling which is assembled by plugging together is known so that further explanations are unnecessary.

All of the couplings shown in the figures have an opening 36 in the coupling element 10 so that the threaded hexagon screw 21 is accessible from the second clamping unit 6.

The invention claimed is:

1. A hollow shaft coupling configured to connect a shaft to a hollow shaft, in a manner so that the hollow shaft coupling is to be arranged completely in the hollow shaft and configured to clamp both radially inwardly as well as radially outwardly, said hollow shaft coupling comprising:
   a first annular clamping bush comprising a cylindrical outer circumferential surface and having a first end and a second end, an axially-extending centric cavity within the cylindrical outer circumferential surface having a first tapered receiving surface extending through the first annular clamping bush, a first inner cone having a first and a second end inserted within the centric cavity having a complementary second tapered circumferential surface that is resiliently deformable corresponding to the first tapered receiving surface, an axially-extending centric threaded bore at the first end of the first inner cone, and an axially-extending centric cylindrical inner cavity extending through the second end of the first inner cone, an axially-extending central passage opening extending through the first end of the first annular clamping bush, and a first screw member inserted into the central passage opening and into the centric threaded bore of the first inner cone;
   wherein the first annular clamping bush is configured in a way so that when the first screw member is turned, said first inner cone is drawn into the centric cavity so that the second tapered circumferential surface of the first inner cone slides along the first tapered receiving surface of the centric cavity to clamp the first inner cone radially inwardly against a shaft receivable in the centric cylindrical inner cavity of the first inner cone;
   a second annular clamping bush which is separate from the first annular clamping bush comprising at least one axially-extending threaded bore in the second annular clamping bush, a cylindrical outer circumferential surface that is resiliently deformable, an axially-extending inner circumferential surface extending through the second annular clamping bush having a third tapered surface that tapers conically in a direction toward the first annular clamping bush configured to form an inner space having a cone-shaped cross-section, a second cone inserted into the inner space having an outer circumferential surface that is tapered in a direction toward the first annular clamping bush, said second cone comprising at least one axially-extending first through-bore corresponding with the at least one threaded bore in the second annular clamping bush, at least one second screw member inserted into the at least one first through-bore of the second cone and the at least one threaded bore of the second annular clamping bush;
   wherein the second annular clamping bush is configured in a way so that when the at least one second screw member is turned, the second cone is drawn into the inner space so that the outer circumferential surface of the second cone slides along the third tapered surface of the inner circumferential surface to clamp the second annular clamping bush against an inner circumferential surface of a hollow shaft by having the cylindrical outer circumferential surface radially expanded outwardly; and
   a coupling element comprising a bellows coupling having one end connected to the first annular clamping bush and a second end connected to the second annular clamping bush to couple the first annular clamping bush and the second annular clamping bush, said coupling element comprising an axially extending opening located centrically in a body of the coupling element, wherein the at least one first screw member of the first annular clamping bush is accessible through the axially extending opening.

2. The hollow shaft coupling according to claim 1, wherein the outer diameter of the second clamping bush is larger than the outer diameter of the first clamping bush.

3. The hollow shaft coupling according to claim 1, wherein the first and/or second threaded screw member is a hexagon screw.

4. A hollow shaft coupling configured to connect a shaft to a hollow shaft, in a manner so that the hollow shaft coupling is to be arranged completely in the hollow shaft and configured to clamp both radially inwardly as well as radially outwardly, said hollow shaft coupling comprising:
   a first annular clamping bush comprising a cylindrical outer circumferential surface and having a first end and a second end, an axially-extending centric cavity within the cylindrical outer circumferential surface having a first tapered receiving surface extending through the first annular clamping bush, a first inner cone having a first and a second end inserted within the centric cavity having a complementary second tapered circumferential surface that is resiliently deformable corresponding to the first tapered receiving surface, an axially-extending centric threaded bore at the first end of the first inner cone, and an axially-extending centric cylindrical inner cavity extending through the second end of the first inner cone, an axially-extending central passage opening extending through the first end of the first annular clamping bush, and a first screw member inserted into the central passage opening and into the centric threaded bore of the first inner cone;

wherein the first annular clamping bush is configured in a way so that when the first screw member is turned, said first inner cone is drawn into the centric cavity so that the second tapered circumferential surface of the first inner cone slides along the first tapered receiving surface of the centric cavity to clamp the first inner cone radially inwardly against a shaft receivable in the centric cylindrical inner cavity of the first inner cone;

a second annular clamping bush which is separate from the first annular clamping bush comprising at least one axially-extending threaded bore in the second annular clamping bush, a cylindrical outer circumferential surface that is resiliently deformable, an axially-extending inner circumferential surface extending through the second annular clamping bush having a third tapered surface that tapers conically in a direction toward the first annular clamping bush configured to form an inner space having a cone-shaped cross-section, a second cone inserted into the inner space having an outer circumferential surface that is tapered in a direction toward the first annular clamping bush, said second cone comprising at least one axially-extending first through-bore corresponding with the at least one threaded bore in the second annular clamping bush, at least one second screw member inserted into the at least one first through-bore of the second cone and the at least one threaded bore of the second annular clamping bush;

wherein the second annular clamping bush is configured in a way so that when the at least one second screw member is turned, the second cone is drawn into the inner space so that the outer circumferential surface of the second cone slides along the third tapered surface of the inner circumferential surface to clamp the second annular clamping bush against an inner circumferential surface of a hollow shaft by having the cylindrical outer circumferential surface radially expanded outwardly; and a coupling element comprising a bellows coupling having one end connected to the first annular clamping bush and configured to couple the first annular clamping bush and the second annular clamping bush, said coupling element comprising an axially extending opening located centrically in a body of the coupling element, wherein the at least one first screw member of the first annular clamping bush is accessible through the axially extending opening.

* * * * *